US012661682B2

(12) United States Patent
Liu et al.

(10) Patent No.: US 12,661,682 B2
(45) Date of Patent: Jun. 23, 2026

(54) COATING EXTRUSION HEAD AND COATING APPARATUS

(71) Applicant: CONTEMPORARY AMPEREX TECHNOLOGY (HONG KONG) LIMITED, Hong Kong (CN)

(72) Inventors: Yang Liu, Ningde (CN); Huan Che, Ningde (CN); Shisong Li, Ningde (CN); Yalong Qing, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 443 days.

(21) Appl. No.: 18/222,483

(22) Filed: Jul. 17, 2023

(65) Prior Publication Data

US 2023/0356258 A1 Nov. 9, 2023

Related U.S. Application Data

(63) Continuation of application No. PCT/CN2022/123257, filed on Sep. 30, 2022.

(30) Foreign Application Priority Data

Oct. 29, 2021 (CN) ......................... 202122621850.1

(51) Int. Cl.
*B05C 5/02* (2006.01)
*B05C 11/10* (2006.01)

(52) U.S. Cl.
CPC .......... *B05C 5/0258* (2013.01); *B05C 5/0254* (2013.01); *B05C 11/1002* (2013.01); *B05C 11/1005* (2013.01)

(58) Field of Classification Search
CPC ............... B05C 11/0254; B05C 5/0258; B05C 11/1013; B05C 11/1005; B05C 11/1002
See application file for complete search history.

(56) References Cited

U.S. PATENT DOCUMENTS 6,010,078 A 1/2000 Eberhardt et al.
6,139,639 A * 10/2000 Kitamura .............. B05C 5/0254 118/DIG. 2

(Continued)

FOREIGN PATENT DOCUMENTS

CN 103100506 A 5/2013
CN 106984499 A 7/2017

(Continued)

OTHER PUBLICATIONS

English machine translation of KR20110011470 (Year: 2011).*

(Continued)

*Primary Examiner* — Scott W Dodds
(74) *Attorney, Agent, or Firm* — XSENSUS LLP

(57) ABSTRACT

A coating extrusion head may include an extrusion head body and at least one pressure regulating assembly. The extrusion head body may be provided with a coating slot and an accommodating cavity which may be in communication with each other. The at least one pressure regulating assembly may be arranged in the accommodating cavity, and the pressure regulating assembly may be configured to be expandable in a first direction perpendicular to the coating slot.

20 Claims, 4 Drawing Sheets

(56) References Cited

U.S. PATENT DOCUMENTS

| | | | | |
|---|---|---|---|---|
| 9,259,757 | B1 * | 2/2016 | Santarsiero | B05C 17/0052 |
| 2004/0080075 | A1 | 4/2004 | Pekurovsky et al. | |
| 2004/0139913 | A1 | 7/2004 | Kuromiya et al. | |
| 2011/0271903 | A1 * | 11/2011 | Durst | B05C 5/0254 118/300 |
| 2020/0353500 | A1 * | 11/2020 | Kim | B05C 11/1002 |

FOREIGN PATENT DOCUMENTS

| | | | | | |
|---|---|---|---|---|---|
| CN | 209697340 | U | | 11/2019 | |
| CN | 111760757 | A | | 10/2020 | |
| CN | 216064014 | U | | 3/2022 | |
| EP | 3643411 | A1 | * | 4/2020 | B05C 5/025 |
| EP | 3747652 | A2 | * | 12/2020 | G02F 1/133331 |
| JP | 2003-340338 | A | | 12/2003 | |
| JP | 2017-047344 | A | | 3/2017 | |
| KR | 20070092384 | A | | 9/2007 | |
| KR | 20110011470 | A | * | 2/2011 | B05B 15/60 |
| WO | 2020/066439 | A1 | | 4/2020 | |

OTHER PUBLICATIONS

English machine translation of CN106984499 (Year: 2017).*
English machine translation of JP2017047344 (Year: 2017).*
Extended European Search Report issued Jul. 17, 2024 in European Patent Application No. 22885591.2.
International Search Report and Written Opinion mailed on Nov. 8, 2022, received for PCT Application PCT/CN2022/123257, filed on Sep. 30, 2022, 13 pages including English Translation.

* cited by examiner

COATING EXTRUSION HEAD AND COATING APPARATUS

CROSS-REFERENCE TO RELATED APPLICATIONS

The present application is a continuation of International Application No. PCT/CN2022/123257, filed Sep. 30, 2022, which claims priority to Chinese Patent Application No. CN 202122621850.1 filed with the China National Intellectual Property Administration on Oct. 29, 2021 and entitled "COATING EXTRUSION HEAD AND COATING APPARATUS", each of which is incorporated herein by reference in its entirety.

TECHNICAL FIELD

The present application relates to the technical field of coating of battery substrates, and in particular to a coating extrusion head and a coating apparatus.

BACKGROUND ART

Coating is an essential procedure in the battery production process, and is mainly used in the preparation of electrode sheets of batteries. Coating in the preparation of electrode sheets refers to the process of evenly, continuously or intermittently coating a prepared paste-like viscous slurry on the electrode sheets. It is necessary to ensure that the thickness of the electrode sheet is consistent at each coating position, and to control the coating thickness within a tolerance range meeting the process requirements. The quality of coating directly affects various performances of the battery such as safety, capacity and consistency.

At present, in the related art, when an electrode sheet is being coated, the uneven slurry in a coating area affects the quality of the battery.

Technical Problem

One of the objectives of embodiments of the present application is to provide a coating extrusion head and a coating apparatus, which can solve the problem of uneven slurry in a coated area when coating is performed by the existing coating extrusion head.

Technical Solutions

The technical solutions adopted in the embodiments of the present application are as follows.

In a first aspect, a coating extrusion head is provided, including an extrusion head body and at least one pressure regulating assembly. The extrusion head body is internally provided with an accommodating cavity, and the extrusion head body is further provided with a coating slot in communication with the accommodating cavity. The at least one pressure regulating assembly is arranged in the accommodating cavity, and the pressure regulating assembly is configured to be expandable in a first direction perpendicular to the coating slot.

In one embodiment, the pressure regulating assembly includes an expandable device and a pressure sensor, wherein the pressure sensor is arranged on a surface of the expandable device, and the pressure sensor is configured to detect a pressure on the surface of the expandable device and transmit a pressure signal to an external control system; and the expandable device is configured to expand and contract based on a control signal from the control system.

In one embodiment, the pressure regulating assembly further includes a wireless signal transceiver, the wireless signal transceiver being configured to transmit the pressure signal from the pressure sensor to the external control system in a wireless transmission manner, and the wireless signal transceiver being further configured to receive the control signal sent from the external control system and transmit the control signal to the expandable device.

In one embodiment, the expandable device is a piezoelectric driving device.

In one embodiment, there are a plurality of pressure regulating assemblies, which are arranged linearly.

In one embodiment, the extrusion head body further includes an elastic protective film arranged in the accommodating cavity, and the elastic protective film covers at least one of the pressure regulating assemblies and is elastically deformed with the expansion and contraction of the pressure regulating assemblies.

In one embodiment, the elastic protective film is a carbon fiber film or a tetrafluoroethylene film.

In one embodiment, the extrusion head body includes an upper extrusion head and a lower extrusion head, wherein the upper extrusion head is snap-fitted with an upper portion of the lower extrusion head, and the upper extrusion head and the lower extrusion head jointly define the accommodating cavity.

In one embodiment, the coating extrusion head further includes a sealing gasket, which is arranged at a contact portion between the upper extrusion head and the lower extrusion head.

In one embodiment, the lower extrusion head is provided with a groove, and the upper extrusion head is snap-fitted with the lower extrusion head to enclose the groove to form the accommodating cavity.

In one embodiment, the extrusion head body further includes a fastener, the upper extrusion head is provided with a first mounting hole, the lower extrusion head is provided with a second mounting hole, and the fastener passes through the first mounting hole and the second mounting hole to fixedly connect the upper extrusion head to the lower extrusion head.

In one embodiment, the coating slot is arranged between the upper extrusion head and the lower extrusion head, and the surface of the upper extrusion head close to the coating slot and the surface of the lower extrusion head close to the coating slot are both provided with wear-resistant material layers.

In one embodiment, the wear-resistant material layers are ceramic layers or silicon carbide layers.

In one embodiment, an edge of the upper extrusion head is provided with a handle portion for grasping.

In a second aspect, a coating apparatus is provided, including the coating extrusion head in any one of the above embodiments.

Beneficial Effects

The beneficial effects of the coating extrusion head provided in the embodiments of the present application are as follows: the at least one pressure regulating assembly is arranged in the accommodating cavity, and the pressure regulating assembly can expand and contract in a direction perpendicular to the coating slot, to adjust the volume of the accommodating cavity, so as to change a flow of a slurry in the accommodating cavity; during the performing of the coating process, when the weight of the slurry in a coated single point or local area is too large, the pressure regulating assembly can be controlled to contract so as to increase the volume of the accommodating cavity, so that the flow of the slurry in the accommodating cavity will be reduced, and the weight of the slurry sprayed to the coated single point or local area can thus be reduced; and when the weight of the slurry in a coated single point or local area is too small, the pressure regulating assembly can be controlled to expand so as to reduce the volume of the accommodating cavity, so that the flow of the slurry in the accommodating cavity will be increased, and the weight of the slurry sprayed to the coated single point or local area can be increased. In this way, it is possible to control the weight of the slurry in a coated single point or local area when coating is performed by the coating extrusion head, so that the weight of the coated slurry is uniform and stable. It can be seen that this solution can solve the problem of non-uniform and unstable weight of the slurry in a coated single point or local area when coating is performed by the existing coating extrusion head.

The beneficial effects of the coating apparatus provided in the embodiments of the present application are as follows: since the coating apparatus is provided with the coating extrusion head in the embodiments of the first aspect, by arranging the at least one pressure regulating assembly in the accommodating cavity of the coating extrusion head, and by expanding and contracting the pressure regulating assembly in a direction perpendicular to the coating slot, it is possible to adjust the volume of the accommodating cavity, so as to change a flow of a slurry in the accommodating cavity, to enable the control of the weight of the slurry in a coated single point or local area when coating is performed by the coating extrusion head, so that the weight of the coated slurry is uniform and stable. Therefore, the coating apparatus in the embodiments of the present application can also solve the problem of non-uniform and unstable weight of the slurry in a coated single point or local area when coating is performed by the existing coating extrusion head.

DESCRIPTION OF DRAWINGS

In order to more clearly illustrate the technical solutions in the embodiments of the present application, the drawings to be used in the embodiments or exemplary technical descriptions will be described briefly below. Obviously, the drawings in the following description are merely for some embodiments of the present application. For those of ordinary skill in the art, other drawings can also be obtained according to these drawings without involving any inventive effort.

DESCRIPTION OF REFERENCE NUMERALS

Figure 1:
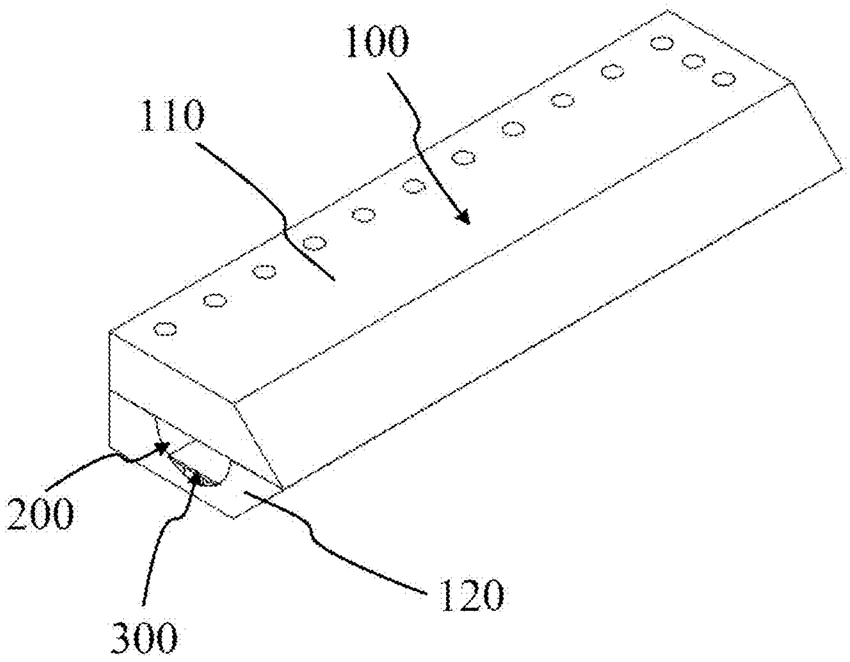
FIG. 1 is a schematic structural diagram of a coating extrusion head according to an embodiment of the present application.
Figure 2:
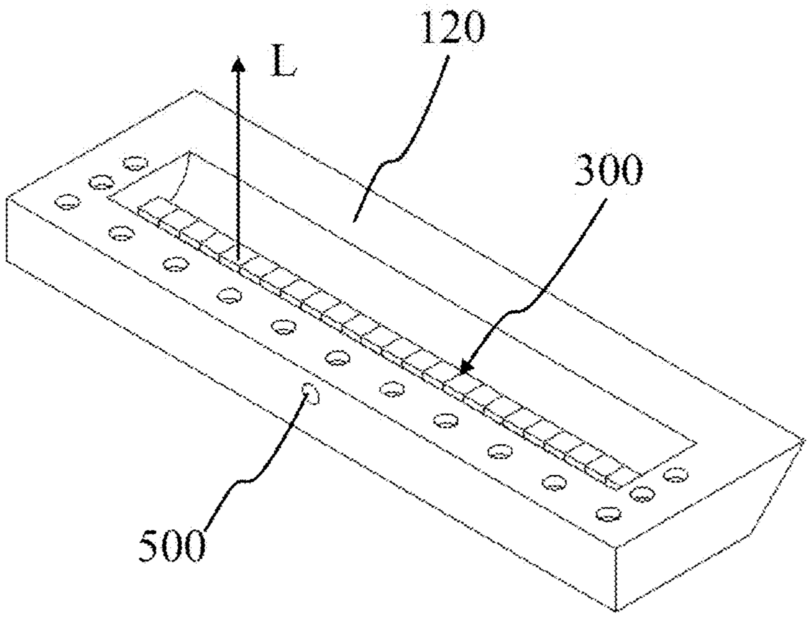
FIG. 2 is a schematic structural diagram of a lower extrusion head and a pressure regulating assembly of a coating extrusion head according to an embodiment of the present application.

100. Extrusion head body; 110. Upper extrusion head; 111. Groove; 112. Handle portion; 113. First mounting hole; 120. Lower extrusion head; 121. Second mounting hole; 130. Elastic protective film; 140. Gasket;

200. Accommodating cavity;

300. Pressure regulating assembly; 310. Expandable device; 320. Pressure sensor; 330. Wireless signal transceiver;

400. Coating slot;

500. Slurry inlet;

L. First direction.

DETAILED DESCRIPTION

In order to make the objectives, technical solutions, and advantages of the present application clearer, the present application is described in further detail below with reference to the drawings and embodiments. It should be understood that the particular embodiments described herein are only used for illustrating the present application and not intended to limit the present application.

It should be noted that when a component is referred to as being "fixed to" or "arranged on" another component, it may be directly on the other component or be indirectly on the other component. When a component is referred to as being "connected" to another component, it may be directly or indirectly connected to the other component. It should be understood that the orientations or positional relationships indicated by the terms "up", "down", "left", "right", etc. are based on the orientations or positional relationships shown in the drawings, and are only for the convenience of description, rather than indicating or implying that an apparatus or component referred to must have a specific orientation or be constructed and operated in a specific orientation, and therefore cannot be construed as limiting the present application. For those of ordinary skill in the art, the specific meanings of the above terms can be understood according to specific situations. In addition, the terms "first" and "second" are used for the convenience of description only, and cannot be construed as indicating or implying relative importance or implicitly indicating the number of technical features. The term "plurality of" means two or more, unless specifically and specifically limited otherwise.

Coating is an indispensable procedure in the production process of lithium-ion batteries, and it is also a key procedure that directly affects various performances of the battery such as safety, capacity and consistency. Coating is to coat a prepared battery slurry on a substrate (aluminum foil or copper foil) evenly, continuously or intermittently, to ensure the thickness consistency at each coating position, and to control the coating thickness within a tolerance range meeting the process requirements.

At present, there are two commonly used coating methods in China: transfer coating and extrusion coating. Transfer coating is a mature technology, but involves complex structure and cumbersome equipment debugging. Moreover, the slurry for transfer coating is in a bare state (that is, the slurry is exposed to the air), and it is difficult to guarantee the performance of the slurry.

The technology for extrusion coating machines has become increasingly mature, and involves simple structure, compact equipment and convenient debugging. In addition, the slurry in a coating head is in an enclosed state and isolated from the outside, so that a good variety of slurry can be ensured. Moreover, the coating accuracy of the extrusion coating machines is much higher than that of the traditional transfer coating machines. The current experimental results show that the minimum thickness limit is 50 um in transfer coating, but may reach 20 um in extrusion coating. Therefore, it has become a development trend to use extrusion coating machines to coat electrode sheets of lithium-ion batteries, etc.

At present, in the related art, when an electrode sheet is to be coated, the weight of the slurry keeps changing in the extrusion head, so that the coated single point or local area still cannot be completely consistent, which undoubtedly causes the coating weight in the coated single point or local area is low or high, thereby affecting the quality of the battery. After repeated research and demonstrations, the applicant has designed a coating extrusion head, in which a plurality of pressure regulating assemblies are arranged in an accommodating cavity of an extrusion head, so that the pressure regulating assemblies can adjust the volume of the accommodating cavity, and the weight of the slurry can be more uniform and stable during coating.

The coating extrusion head disclosed in the embodiments of the present application can be better applied to the preparation process of the electrode sheet of the battery. The electrode sheet is an important part of a cell assembly of the battery. Specifically, the cell assembly is a component of a battery cell where an electrochemical reaction occurs. One or more cell assemblies may be contained in a case. The cell assembly is mainly formed by winding or stacking a positive electrode sheet and a negative electrode sheet, and a separator is generally provided between the positive electrode sheet and the negative electrode sheet. The parts of the positive electrode sheet and the negative electrode sheet having active materials constitute a main portion of the cell assembly, and the parts of the positive electrode sheet and the negative electrode sheet having no active materials respectively constitute tabs. The positive tab and the negative tab may be located at one end of the main portion together or at two ends of the main portion respectively. During the charging or discharging process of the battery, the positive active material and the negative active material react with an electrolyte solution, and the tabs are connected to electrode terminals to form a current loop.

The battery mentioned in the embodiments of the present application refers to a single physical module comprising one or more battery cells to provide a higher voltage and capacity. For example, the battery mentioned in the present application may include a battery module, a battery pack, or the like.

In order to illustrate the technical solutions provided by the present application, the detailed description will be given below with reference to the specific drawings and embodiments.

As shown in FIGS. 1 to 7, the embodiments of the first aspect of the present application propose a coating extrusion head. The coating extrusion head includes an extrusion head body 100 and at least one pressure regulating assembly 300. The extrusion head body 100 is internally provided with an accommodating cavity 200, and the extrusion head body 100 is further provided with a coating slot 400 in communication with the accommodating cavity 200. The at least one pressure regulating assembly 300 is arranged in the accommodating cavity 200 and is arranged linearly, and the pressure regulating assembly 300 is configured to be expandable in a first direction L perpendicular to the coating slot 400.

When coating an electrode sheet, the coating extrusion head is used to evenly, continuously or intermittently coat a prepared paste-like viscous slurry on an substrate, and the coating extrusion head has a slurry inlet 500, a spray port and an accommodating cavity 200. The slurry inlet 500 and the spray port should be in communication with the accommodating cavity 200 respectively. The accommodating cavity 200 is configured to accommodate the slurry to be sprayed, the slurry inlet 500 is configured to input the slurry to be sprayed, and the spray port is an outlet of the slurry. The spray port in this embodiment is the coating slot 400. The slurry to be sprayed flows through the spray port and is sprayed onto the electrode sheet. Therefore, the structure and shape of the spray port also determine the shape, direction, coverage, etc. of the slurry during spraying of the slurry.

The extrusion head body 100, as the main part of the coating extrusion head, is generally of a split structure. For example, the extrusion head body 100 may be composed of an upper cover and a lower cover, and the accommodating cavity 200 capable of accommodating the slurry is between the upper cover and the lower cover. Due to the viscosity of the slurry, the split design of the extrusion head body 100 can facilitate the cleaning and maintenance of the accommodating cavity 200. In some application occasions, the extrusion head body 100 may also be integrally formed. The present application has no special limitation on the specific form of the extrusion head body 100.

The coating slot 400 is the spray port of the coating extrusion head, and the slurry to be sprayed flows through the coating slot 400 and is sprayed onto the electrode sheet. The coating slot 400 of the coating extrusion head is an elongated gap, and the slurry flows out from the elongated gap and is sprayed onto the electrode sheet. The width of the gap in the coating slot 400 and the pressure during spraying jointly determine the shape, direction, coverage, etc. of the slurry during spraying of the slurry.

The pressure regulating assembly 300 is configured to adjust the volume of the accommodating cavity 200. When the electrode sheet is to be coated, as the volume of the accommodating cavity 200 changes, the volume of the slurry in the accommodating cavity 200 also changes accordingly, thereby changing the amount of slurry sprayed in the accommodating cavity 200. The pressure regulating assembly 300 can expand and contract in the first direction L perpendicular to the coating slot 400. Since the coating slot 400 is an elongated gap, when the pressure regulating assembly 300 expands and contracts in the first direction L perpendicular to the coating slot 400, the volume of the accommodating cavity 200 corresponding to the coating slot 400 can be changed, thereby controlling the flow of the slurry when flowing through the coating slot 400.

According to the coating extrusion head in the embodiments of the present application, the at least one pressure regulating assembly 300 is arranged in the accommodating cavity 200, and the pressure regulating assembly 300 expands and contracts in a direction perpendicular to the coating slot 400, so that it is possible to adjust the volume of the accommodating cavity 200, so as to change the flow of the slurry in the accommodating cavity 200; during the performing of the coating process, when the weight of the slurry in a coated single point or local area is too large, the pressure regulating assembly 300 can be controlled to contract so as to increase the volume of the accommodating cavity 200, so that the flow of the slurry in the accommodating cavity 200 will be reduced, and the weight of the slurry sprayed to the coated single point or local area can thus be reduced; and when the weight of the slurry in a coated single point or local area is too small, the pressure regulating assembly 300 can be controlled to expand so as to reduce the volume of the accommodating cavity 200, so that the flow of the slurry in the accommodating cavity 200 will be increased, and the weight of the slurry sprayed to the coated single point or local area can be increased. In this way, it is possible to control the weight of the slurry in a coated single point or local area when coating is performed by the coating extrusion head, so that the weight of the coated slurry is uniform and stable. It can be seen that this solution can solve the problem of non-uniform and unstable weight of the slurry in a coated single point or local area when coating is performed by the existing coating extrusion head.

Figure 7:
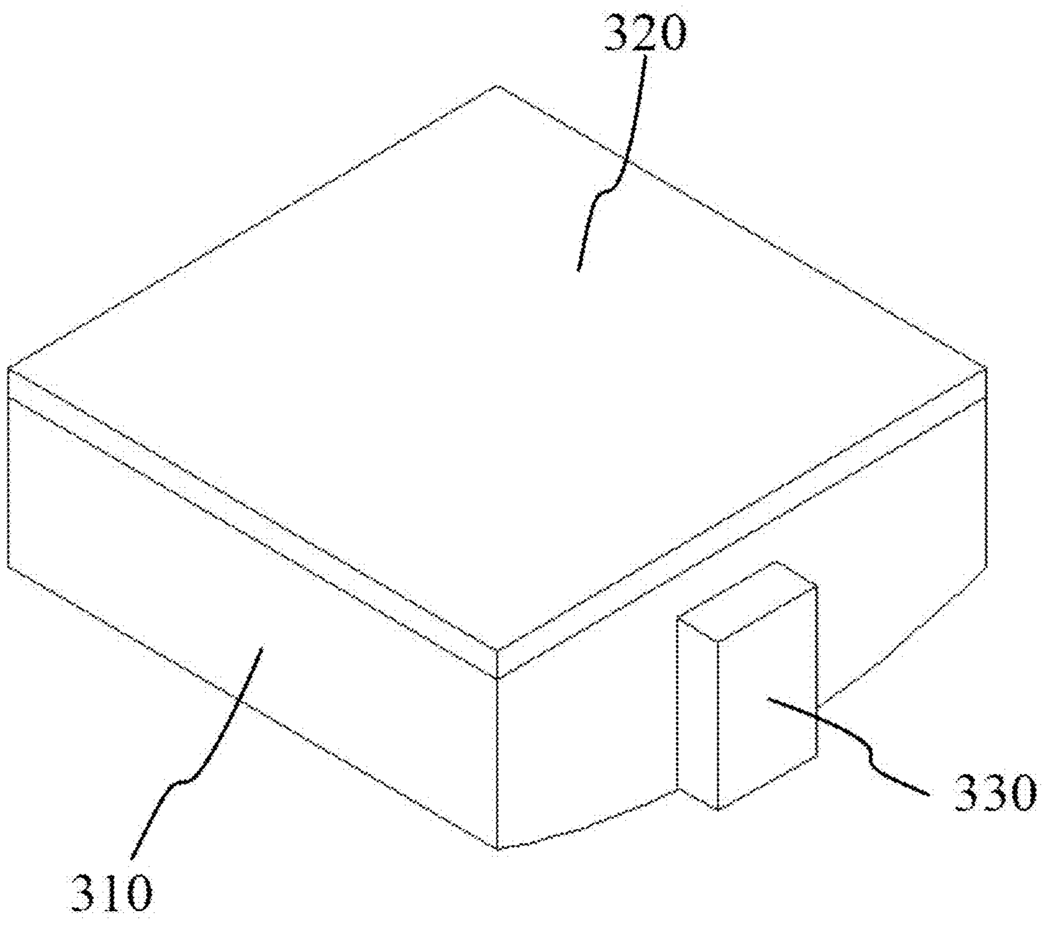
FIG. 7 is a schematic structural diagram of a pressure regulating assembly of a coating extrusion head according to an embodiment of the present application.

In some embodiments of the present application, referring to FIG. 7, the pressure regulating assembly 300 includes an expandable device or structure 310 and a pressure sensor 320. The pressure sensor 320 is arranged on a surface of the expandable device 310, and the pressure sensor 320 is configured to detect a pressure on the surface of the expandable device 310 and transmit a pressure signal to an external control system; and the expandable device 310 is configured to expand and contract based on a control signal from the control system.

The expandable device 310 is a main member of the pressure regulating assembly 300, and is specifically configured to change the volume of the accommodating cavity 200. The expandable device 310 should include a fixed mechanism and a movable mechanism. The fixed mechanism is fixed in the accommodating cavity 200, and the movable mechanism can move in the first direction L relative to the fixed mechanism, to change the volume of the accommodating cavity 200.

The pressure sensor 320 is a means or device capable of sensing a pressure signal and converting the pressure signal into an electrical signal which can be used and output according to certain rules. The pressure sensor 320 may be of various types, such as a gauge pressure sensor, a differential pressure sensor, and an absolute pressure sensor. The pressure sensor 320 is arranged on the surface of the expandable device 310 to detect the pressure inside the accommodating cavity 200.

The external control system may be the control system in the coating apparatus. During the coating process of the coating apparatus, the functions of the control system mainly include: receiving various detection signals, performing corresponding processing on the received detection signals in real time, and sending control signals to actuatable component in the coating apparatus to make them perform corresponding actions.

When there are a plurality of pressure regulating assemblies 300, a pressure sensor 320 is arranged on the surface of each expandable device 310, so that the pressure at a position where an individual expandable device 310 is located can be monitored, and each expandable device 310 can be individually controlled by the control system. In this way, when it is measured that the pressure at a position is too high or too low, the corresponding expandable device 310 can be controlled to expand and contract, so as to regulate the pressure at the corresponding position. In this way, it can be ensured that the pressure at each position in the accommodating cavity 200 is kept consistent, thereby improving the evenness of the slurry discharged from the coating extrusion head.

In some embodiments of the present application, referring to FIG. 7, the pressure regulating assembly 300 further includes a wireless signal transceiver 330. The wireless signal transceiver 330 is configured to transmit the pressure signal of the pressure sensor 320 to the external control system in a wireless transmission manner, the wireless signal transceiver 330 is further configured to receive the control signal sent from the external control system and transmit the control signal to the expandable device 310.

The wireless signal transceiver 330 is a means for receiving and transmitting wireless signals.

With the provision of the wireless signal transceiver 330, the pressure signal of the pressure sensor 320 can be transmitted to the external control system in a wireless transmission manner, and the control signal from the control system can also be transmitted to the expandable device 310 in a wireless transmission manner, so that it is possible to avoid complicated wiring and the corrosion of cables caused by the slurry.

In some embodiments of the present application, the expandable device 310 is a piezoelectric driving device.

The piezoelectric driving device can convert electrical energy into mechanical energy or mechanical motion by using the inverse piezoelectric effect (transverse effect and longitudinal effect) of a piezoelectric material (polymer bimorph), which may be specifically a piezoelectric actuator. In this embodiment, when receiving an expansion/contraction signal, the piezoelectric driving device can convert the electrical signal into mechanical motion, so that the expanded/contracted state of the movable mechanism in the expandable device 310 can be changed according to the change of the expansion/contraction signal, so as to control the volume of the accommodating cavity 200.

Figure 6:
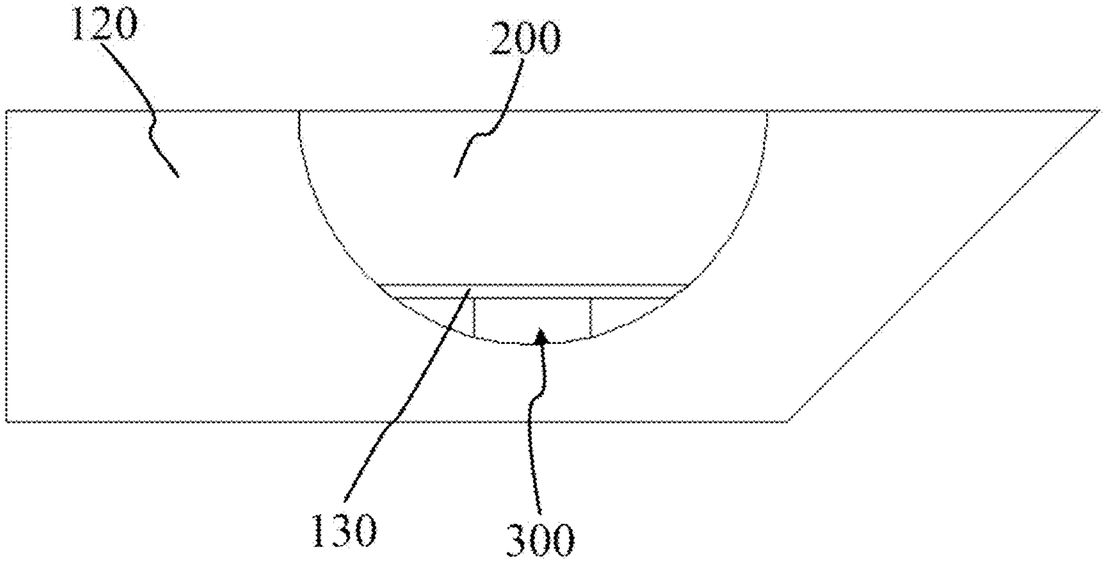
FIG. 6 is a side view of a coating extrusion head according to an embodiment of the present application.

In some embodiments of the present application, referring to FIG. 6, the extrusion head body 100 further includes an elastic protective film 130 arranged in the accommodating cavity 200. The elastic protective film 130 covers at least one of the pressure regulating assemblies 300 and is elastically deformed with the expansion and contraction of the pressure regulating assemblies 300.

The elastic protective film 130 is a film structure with a certain degree of elasticity. The elastic protective film 130 covers at least one of the pressure regulating assemblies 300 and can be elastically deformed with the expansion and contraction of the pressure regulating assemblies 300. Therefore, the elastic protective film 130 needs to have a certain degree of flexibility and toughness. The elastic protective film 130 is arranged in the accommodating cavity 200 in order to avoid damage to the elastic protective film 130, while the accommodating cavity 200 is configured to accommodate the slurry, so the elastic protective film 130 also needs to have anti-corrosion properties, so as to ensure that the elastic protective film 130 will not be corroded by the slurry.

In this embodiment, by covering the pressure regulating assembly 300 with the elastic protective film 130, the pressure regulating assembly 300 can be isolated from the slurry in the accommodating cavity 200, so as to prevent the slurry from flowing into the pressure regulating assembly 300 to cause corrosion and damage to the electrical apparatus of the pressure regulating assembly 300.

In some embodiments of the present application, the elastic protective film 130 is a carbon fiber film or a tetrafluoroethylene film.

The carbon fiber film has super tensile strength and excellent stretchability, and is less likely to be broken, so it can be used as the first choice for the elastic protective film

130. The tetrafluoroethylene film has the characteristics of high temperature resistance and corrosion resistance, and may also be used as the elastic protective film 130.

In some embodiments of the present application, referring to FIG. 1, the extrusion head body 100 includes an upper extrusion head 110 and a lower extrusion head 120. The upper extrusion head 110 is snap-fitted with an upper portion of the lower extrusion head 120, and the upper extrusion head 110 and the lower extrusion head 120 jointly define the accommodating cavity 200.

The upper extrusion head 110 and the lower extrusion head 120 are the main parts of the extrusion head body 100. In the related art, the upper extrusion head 110 and the lower extrusion head 120 may also be called upper lip and lower lip, or upper cover and lower cover. In this embodiment, the accommodating cavity 200 is located in the middle of the upper extrusion head 110 and the lower extrusion head 120. During coating, the pressure inside the accommodating cavity 200 is relatively high; therefore, the upper extrusion head 110 and the lower extrusion head 120 are generally metal members, which have good strength and rigidity and can avoid deformation of the extrusion head body 100 caused by the excessive pressure inside the accommodating cavity 200 of the extrusion head body 100. The upper extrusion head 110 and the lower extrusion head 120 are respectively provided with a plurality of first mounting holes 113 and second mounting holes 121, and fasteners may pass through the first mounting holes 113 and the second mounting holes 121 to fix the upper extrusion head 110 and the lower extrusion head 120 together.

Further, the surfaces of the upper extrusion head 110 and the lower extrusion head 120 close to the coating slot 400 are provided with wear-resistant material layers. The wear-resistant material layers may be ceramic layers or silicon carbide layers. It can be understood that, during coating of the electrode sheet, the slurry is sprayed from the coating slot 400 formed by the upper extrusion head 110 and the lower extrusion head 120; so, with the surfaces of the upper extrusion head 110 and the lower extrusion head 120 close to the coating slot 400 being provided with wear-resistant material layers, the abrasion of the upper extrusion head 110 and the lower extrusion head 120 by the slurry can be reduced, so as to prolong the service life of the extrusion head body 100.

In this embodiment, the extrusion head body 100 is a split design. The accommodating cavity 200 capable of accommodating the slurry is formed in the extrusion head body 100, and after the frequent use of the coating extrusion head, the slurry will be adhered to an inner wall of the accommodating cavity 200. Therefore, the split design of the extrusion head body 100 facilitates the cleaning of the accommodating cavity 200, and the split extrusion head body 100 is easier to manufacture than the one-piece coating extrusion head, so that the manufacturing cost of the coating extrusion head can also be reduced.

Figure 5:
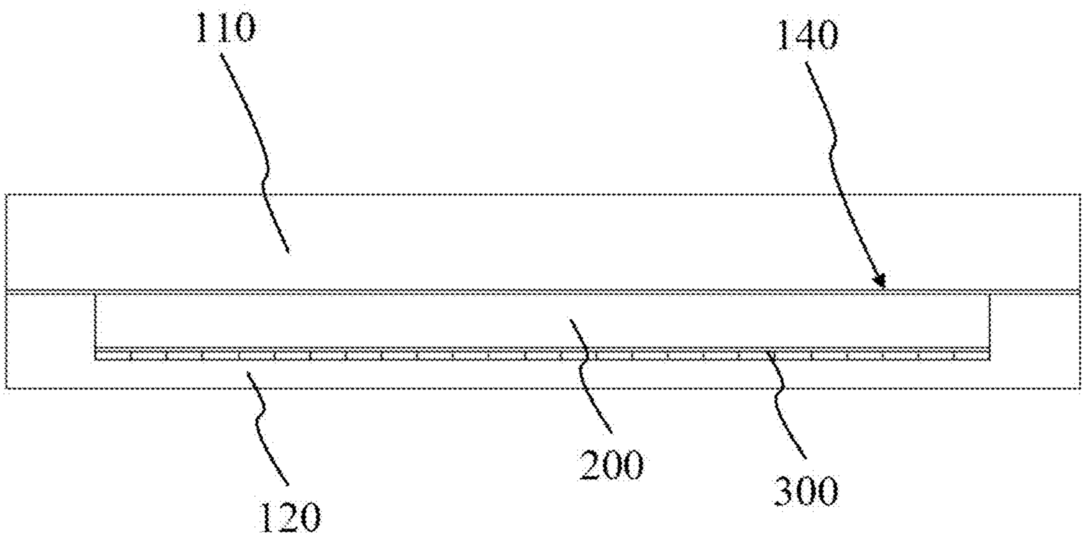
FIG. 5 is a front view of a coating extrusion head according to an embodiment of the present application.

In some embodiments of the present application, referring to FIG. 5, the coating extrusion head further includes a sealing gasket 140. The sealing gasket 140 is arranged at a contact portion between the upper extrusion head 110 and the lower extrusion head 120.

The sealing gasket 140 is arranged between the upper extrusion head 110 and the lower extrusion head 120. The sealing gasket 140 has a sealing effect, so the sealing gasket 140 needs to have an elastic deformation capacity. Specifically, the sealing gasket 140 may be of corrosion-resistant rubber.

In this embodiment, by arranging the sealing gasket 140 at the contact portion between the upper extrusion head 110 and the lower extrusion head 120, the contact portion between the upper extrusion head 110 and the lower extrusion head 120 is sealed.

Figure 3:
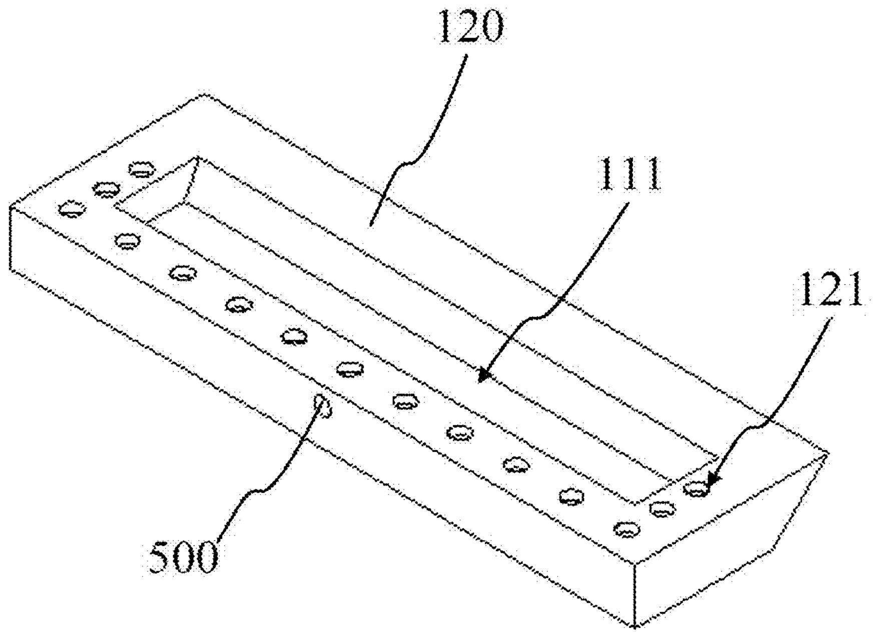
FIG. 3 is a schematic structural diagram of a lower extrusion head of a coating extrusion head according to an embodiment of the present application.

In some embodiments of the present application, referring to FIG. 3, the lower extrusion head 120 is provided with a groove 111, and the upper extrusion head 110 is snap-fitted with the lower extrusion head 120 to enclose the groove 111 to form the accommodating cavity 200.

For the groove 111 provided on the lower extrusion head 120, the shape of the groove 111 is not particularly limited, but the groove 111 should have the same cross-sectional area, so as to ensure the same volume of the accommodating cavity 200 corresponding to the coating slot 400. The expandable device 310 is arranged in the groove 111, so when designing the size of the groove 111, it should also be considered that the groove 111 can accommodate the expandable device 310.

In this embodiment, the accommodating cavity 200 can be formed by snap-fitting the upper extrusion head 110 with the lower extrusion head 120 to enclose the groove 111; since only the lower extrusion head 120 is provided with the groove 111, the manufacturing of the upper extrusion head 110 can be relatively simple, thereby achieving the purpose of reducing costs.

Figure 4:
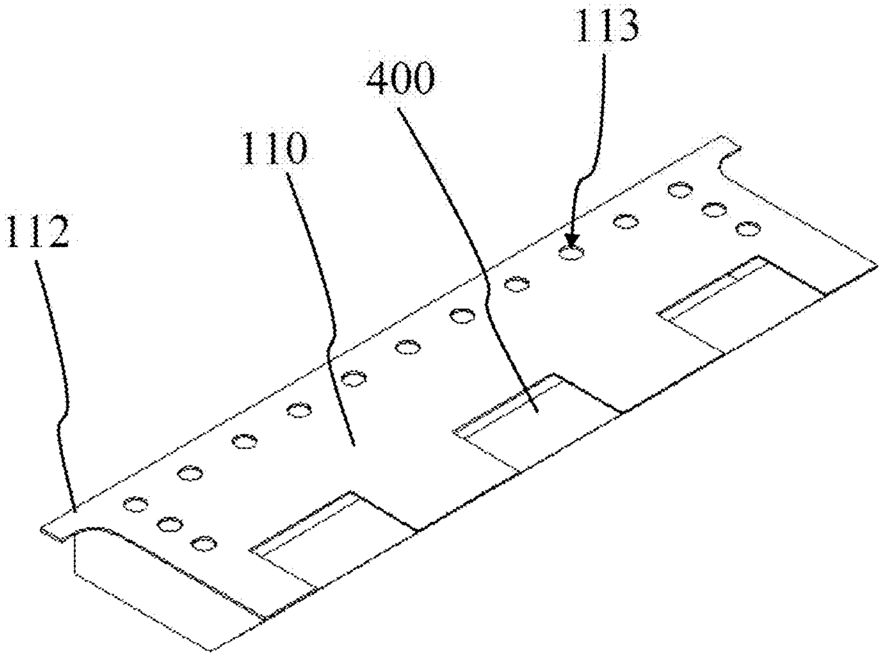
FIG. 4 is a schematic structural diagram of an upper extrusion head of a coating extrusion head according to an embodiment of the present application.

In some embodiments of the present application, referring to FIG. 4, an edge of the upper extrusion head 110 is provided with a handle portion 112 for grasping.

When disassembling the upper extrusion head 110 and the lower extrusion head 120, an operator can hold the handle portion 112 to facilitate the disassembly of the upper extrusion head 110 and the lower extrusion head 120. Therefore, the handle portion 112 may be in any shape that can be held by hand, which will not be specifically limited in the present application again.

In this embodiment, the upper extrusion head 110 and the lower extrusion head 120 can be separated more conveniently by providing the handle portion 112 at the edge of the upper extrusion head 110.

In some embodiments of the present application, the coating extrusion head includes an extrusion head body 100 and at least one pressure regulating assembly 300. The extrusion head body 100 includes an upper extrusion head 110, a lower extrusion head 120, a sealing gasket 140, a carbon fiber film and a handle portion 112. The lower extrusion head 120 is provided with a groove 111, and the upper extrusion head 110 is snap-fitted with the lower extrusion head 120 to form an accommodating cavity 200. The sealing gasket 140 is arranged between the upper extrusion head 110 and the lower extrusion head 120, and separates the upper extrusion head 110 from the lower extrusion head 120 to form a coating slot 400. The carbon fiber film covers the pressure regulating assembly 300 and is elastically deformed with the expansion and contraction of the pressure regulating assembly 300. An edge of the upper extrusion head 110 is provided with a handle portion 112 for grasping. The at least one pressure regulating assembly 300 is arranged in the accommodating cavity 200 and is arranged linearly, and the pressure regulating assembly 300 is configured to be expandable in a first direction L perpendicular to the coating slot 400. The pressure regulating assembly 300 includes an expandable device 310, a pressure sensor 320 and a wireless signal transceiver 330. The expandable device 310 can expand and contract in the first direction L when receiving an expansion/contraction control signal. The pressure sensor 320 is arranged on a surface of the expandable device 310, and the pressure sensor 320 is configured to detect a pressure on the surface of the expandable device 310. The wireless signal transceiver 330 is configured to transmit the pressure signal from the pressure sensor 320 to the external control system in a wireless transmission manner, and the wireless signal transceiver 330 is further configured to receive the control signal sent from the control system and transmit the control signal to the expandable device 310.

According to the coating extrusion head in the embodiments of the present application, the at least one pressure regulating assembly 300 is arranged in the accommodating cavity 200, and the pressure regulating assembly 300 expands and contracts in a direction perpendicular to the coating slot 400, so that it is possible to adjust the volume of the accommodating cavity 200, so as to change the flow of the slurry in the accommodating cavity 200; during the performing of the coating process, when the weight of the slurry in a coated single point or local area is too large, the pressure regulating assembly 300 can be controlled to contract so as to increase the volume of the accommodating cavity 200, so that the flow of the slurry in the accommodating cavity 200 will be reduced, and the weight of the slurry sprayed to the coated single point or local area can thus be reduced; and when the weight of the slurry in a coated single point or local area is too small, the pressure regulating assembly 300 can be controlled to expand so as to reduce the volume of the accommodating cavity 200, so that the flow of the slurry in the accommodating cavity 200 will be increased, and the weight of the slurry sprayed to the coated single point or local area can be increased. In this way, it is possible to control the weight of the slurry in a coated single point or local area when coating is performed by the coating extrusion head, so that the weight of the coated slurry is uniform and stable. It can be seen that this solution can solve the problem of non-uniform and unstable weight of the slurry in a coated single point or local area when coating is performed by the existing coating extrusion head.

In addition, when there are a plurality of pressure regulating assemblies 300, a pressure sensor 320 is arranged on the surface of each expandable device 310, so that the pressure at a position where an individual expandable device 310 is located can be monitored, and each expandable device 310 can be individually controlled by the control system. In this way, when it is measured that the pressure at a position is too high or too low, the corresponding expandable device 310 can be controlled to expand and contract, so as to regulate the pressure at the corresponding position. In this way, it can be ensured that the pressure at each position in the accommodating cavity 200 is kept consistent, thereby improving the evenness of the slurry discharged from the coating extrusion head.

Moreover, with the provision of the wireless signal transceiver 330, the pressure signal of the pressure sensor 320 can be transmitted to the external control system in a wireless transmission manner, and the control signal from the control system can also reach the expandable device 310 in a wireless transmission manner, so that it is possible to avoid complicated wiring and the corrosion of cables caused by the slurry.

The embodiments of the second aspect of the present application propose a coating apparatus, including the coating extrusion head in any one of the embodiments of the first aspect.

The coating apparatus is configured to coat an active material on a current collector to form a electrode sheet. The active material may also be referred to as slurry for short. The slurry is sprayed onto the current collector by a coating extrusion head to form the electrode sheet.

According to the coating apparatus in the embodiments of the present application, since it is provided with the coating extrusion head in any one of the embodiments of the first aspect, the at least one pressure regulating assembly 300 is arranged in the accommodating cavity 200 of the coating extrusion head, and the pressure regulating assembly 300 expands and contracts in a direction perpendicular to the coating slot 400, so that it is possible to adjust the volume of the accommodating cavity 200, so as to change the flow of the slurry in the accommodating cavity 200; during the performing of the coating process, when the weight of the slurry in a coated single point or local area is too large, the pressure regulating assembly 300 can be controlled to contract so as to increase the volume of the accommodating cavity 200, so that the flow of the slurry in the accommodating cavity 200 will be reduced, and the weight of the slurry sprayed to the coated single point or local area can thus be reduced; and when the weight of the slurry in a coated single point or local area is too small, the pressure regulating assembly 300 can be controlled to expand so as to reduce the volume of the accommodating cavity 200, so that the flow of the slurry in the accommodating cavity 200 will be increased, and the weight of the slurry sprayed to the coated single point or local area can be increased. In this way, it is possible to control the weight of the slurry in a coated single point or local area when coating is performed by the coating extrusion head, so that the weight of the coated slurry is uniform and stable. It can be seen that this solution can solve the problem of non-uniform and unstable weight of the slurry in a coated single point or local area when coating is performed by the existing coating extrusion head.

The above are only optional embodiments of the present application and are not intended to be limit the present application. For those skilled in the art, the present application may have various modifications and changes. Any modifications, equivalent substitutions, improvements, etc. made within the spirit and principles of the present application shall fall into the scope of the claims of the present application.

The invention claimed is:

1. A coating extrusion head, comprising:

an extrusion head body provided with an elongated accommodating cavity internally, the elongated accommodating cavity extending along a longitudinal direction, and the extrusion head body being further provided with a coating slot in communication with the elongated accommodating cavity; and a plurality of pressure regulating assemblies arranged in the elongated accommodating cavity and arranged linearly along the longitudinal direction, each pressure regulating assembly among the plurality of pressure regulating assemblies comprises an expandable structure and a pressure sensor arranged on a surface of the expandable structure, wherein the expandable structure is configured to expand in a first direction perpendicular to the longitudinal direction of the elongated accommodating cavity and perpendicular to an extrusion direction of the coating slot to locally adjust a volume of a corresponding portion along the longitudinal direction of the elongated accommodating cavity, and the pressure sensor is configured to detect a pressure on the surface of the expandable structure.

2. The coating extrusion head according to claim 1, wherein: the pressure sensor is configured to transmit a pressure signal to an external control system; and the expandable structure expands and contracts based on a control signal from the control system.

3. The coating extrusion head according to claim 2, wherein;

the pressure regulating assembly further comprises a wireless signal transceiver, the wireless signal transceiver being configured to transmit the pressure signal from the pressure sensor to the control system in a wireless transmission manner, and the wireless signal transceiver being further configured to receive the control signal from the control system and transmit the control signal to the expandable structure.

4. The coating extrusion head according to claim 2, wherein;

the expandable structure is a piezoelectric driving device.

5. The coating extrusion head according to claim 1, wherein:

the extrusion head body further comprises an elastic protective film arranged in the accommodating cavity; and the elastic protective film covers at least one of the pressure regulating assemblies and is elastically deformed with expansion and contraction of the pressure regulating assemblies.

6. The coating extrusion head according to claim 5, wherein:

the elastic protective film is a carbon fiber film or a tetrafluoroethylene film.

7. The coating extrusion head according to claim 1, wherein:

the extrusion head body comprises an upper extrusion head and a lower extrusion head, the upper extrusion head is snap-fitted with an upper portion of the lower extrusion head, and the upper extrusion head and the lower extrusion head jointly define the accommodating cavity.

8. The coating extrusion head according to claim 7, further comprising:

a sealing gasket arranged at a contact portion between the upper extrusion head and the lower extrusion head.

9. The coating extrusion head according to claim 7, wherein:

the lower extrusion head is provided with a groove, and the upper extrusion head is snap-fitted with the lower extrusion head to enclose the groove to form the accommodating cavity.

10. The coating extrusion head according to claim 7, wherein:

the extrusion head body further comprises a fastener, the upper extrusion head is provided with a first mounting hole, the lower extrusion head is provided with a second mounting hole, and the fastener passes through the first mounting hole and the second mounting hole to fixedly connect the upper extrusion head to the lower extrusion head.

11. The coating extrusion head according to claim 7, wherein;

the coating slot is arranged between the upper extrusion head and the lower extrusion head, and a surface of the upper extrusion head close to the coating slot and a surface of the lower extrusion head close to the coating slot are both provided with wear-resistant material layers.

12. The coating extrusion head according to claim 11, wherein:

the wear-resistant material layers are ceramic layers or silicon carbide layers.

13. The coating extrusion head according to claim 7, wherein;

an edge of the upper extrusion head is provided with a handle portion for grasping.

14. A coating apparatus, comprising:

a coating extrusion head, the coating extrusion head including:

an extrusion head body provided with an elongated accommodating cavity internally, the elongated accommodating cavity extending along a longitudinal direction, and the extrusion head body being further provided with a coating slot in communication with the elongated accommodating cavity; and a plurality of pressure regulating assemblies arranged in the elongated accommodating cavity and arranged linearly along the longitudinal direction, each pressure regulating assembly among the plurality of pressure regulating assemblies comprises an expandable structure and a pressure sensor arranged on a surface of the expandable structure, wherein the expandable structure is configured to expand in a first direction perpendicular to the longitudinal direction of the elongated accommodating cavity and perpendicular to an extrusion direction of the coating slot to locally adjust a volume of a corresponding portion along the longitudinal direction of the elongated accommodating cavity, and the pressure sensor is configured to detect a pressure on the surface of the expandable structure.

15. The coating extrusion head according to claim 1, wherein:

each pressure regulating assembly among the plurality of pressure regulating assemblies locally adjusts the volume of the corresponding portion along the longitudinal direction of the elongated accommodating cavity by adjusting a weight of a slurry in a coated single point or local area by expanding or contracting to adjust the volume of the elongated accommodating cavity.

16. The coating extrusion head according to claim 15, wherein:

each pressure regulating assembly among the plurality of pressure regulating assemblies includes a piezoelectric driving device corresponding to the expandable structure and the pressure sensor arranged on a surface of the piezoelectric driving device to detect the pressure at a position where an individual piezoelectric driving device is located to locally adjust the volume of the corresponding portion along the longitudinal direction of the elongated accommodating cavity.

17. The coating apparatus according to claim 14, wherein:

each pressure regulating assembly among the plurality of pressure regulating assemblies locally adjusts the volume of the corresponding portion along the longitudinal direction of the elongated accommodating cavity by adjusting a weight of a slurry in a coated single point or local area by expanding or contracting to adjust the volume of the elongated accommodating cavity.

18. The coating apparatus according to claim 17, wherein: each pressure regulating assembly among the plurality of pressure regulating assemblies includes a piezoelectric driving device corresponding to the expandable structure and the pressure sensor arranged on a surface of the piezoelectric driving device to detect the pressure at a position where an individual piezoelectric driving device is located to locally adjust the volume of the corresponding portion along the longitudinal direction of the elongated accommodating cavity.

19. A coating extrusion head, comprising:

an extrusion head body provided with an elongated accommodating cavity internally, the elongated accommodating cavity extending along a longitudinal direction, and the extrusion head body being further provided with a coating slot in communication with the elongated accommodating cavity, wherein the extrusion head body includes an upper extrusion head and a lower extrusion head, the upper extrusion head is snap-fitted with an upper portion of the lower extrusion head, and the upper extrusion head and the lower extrusion head jointly define the accommodating cavity, and the extrusion head body further includes a sealing gasket arranged at a contact portion between the upper extrusion head and the lower extrusion head; and a plurality of pressure regulating assemblies arranged in the elongated accommodating cavity and arranged linearly along the longitudinal direction, wherein each pressure regulating assembly among the plurality of pressure regulating assemblies includes an expandable structure and a pressure sensor arranged on a surface of the expandable structure, the expandable structure is configured to expand in a first direction perpendicular to the longitudinal direction of the elongated accommodating cavity and perpendicular to an extrusion direction of the coating slot to locally adjust a volume of a corresponding portion along the longitudinal direction of the elongated accommodating cavity, and the pressure sensor is configured to detect a pressure on the surface of the expandable structure.

20. The coating extrusion head according to claim 19, wherein:

the sealing gasket separates the upper extrusion head from the lower extrusion head to form the coating slot.

* * * * *